United States Patent
McCreary et al.

(10) Patent No.: US 7,855,716 B2
(45) Date of Patent: Dec. 21, 2010

(54) INFRARED TOUCHFRAME SYSTEM

(75) Inventors: Dann P. McCreary, Escondido, CA (US); Edward H. Hann, San Marcos, CA (US)

(73) Assignee: Nellcor Puritan Bennett LLC, Boulder, CO (US)

( * ) Notice: Subject to any disclaimer, the term of this patent is extended or adjusted under 35 U.S.C. 154(b) by 882 days.

(21) Appl. No.: 10/508,916

(22) PCT Filed: Mar. 20, 2003

(86) PCT No.: PCT/US03/08577

§ 371 (c)(1), (2), (4) Date: Dec. 6, 2004

(87) PCT Pub. No.: WO03/083767

PCT Pub. Date: Oct. 9, 2003

(65) Prior Publication Data

US 2005/0104860 A1    May 19, 2005

Related U.S. Application Data

(60) Provisional application No. 60/369,047, filed on Mar. 27, 2002.

(51) Int. Cl.
*G09G 5/00* (2006.01)
(52) U.S. Cl. ..................................................... 345/173
(58) Field of Classification Search ........................ None
See application file for complete search history.

(56) References Cited

U.S. PATENT DOCUMENTS

| | | | | |
|---|---|---|---|---|
| 4,703,316 A | * | 10/1987 | Sherbeck | 345/175 |
| 5,179,369 A | | 1/1993 | Person et al. | 340/712 |
| 5,355,149 A | * | 10/1994 | Casebolt | 345/175 |
| 5,707,160 A | | 1/1998 | Bowen | 400/472 |
| 6,229,529 B1 | | 5/2001 | Yano et al. | 345/175 |

FOREIGN PATENT DOCUMENTS

EP    0 572 009    5/1993

* cited by examiner

*Primary Examiner* — Sumati Lefkowitz
*Assistant Examiner* — Tammy Pham

(57) ABSTRACT

A touchframe system includes a plurality of light emitting elements and a plurality of light receiving elements positioned around the perimeter of the display area. Each of the light receiving elements in combination with a plurality of the light emitting elements form a zone of light beam paths. The number and positioning of receivers is sufficient to form a plurality of partially overlapping zone pairs. These zone pairs are arranged relative to the display area such that any touch event lies within at least two zone pairs. A processor monitors each of the zone pairs for blockage of at least one light beam path. Upon such blockage, the processor calculates the location of the touch event associated with the blockage based on the slopes and end points of at least two intersecting blocked light beam paths from a first zone pair and two intersecting blocked light beam paths from a second zone pair.

4 Claims, 10 Drawing Sheets

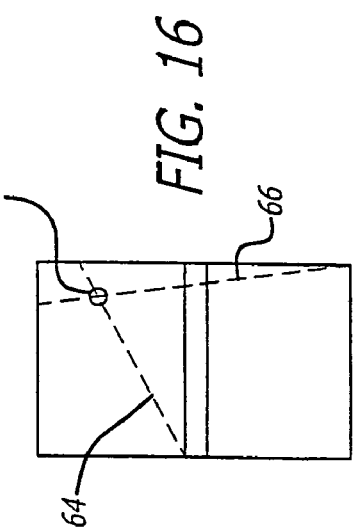
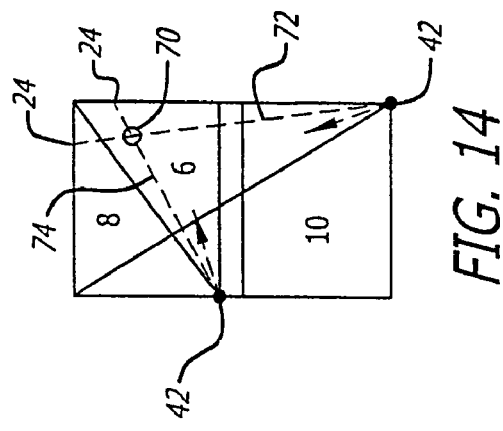
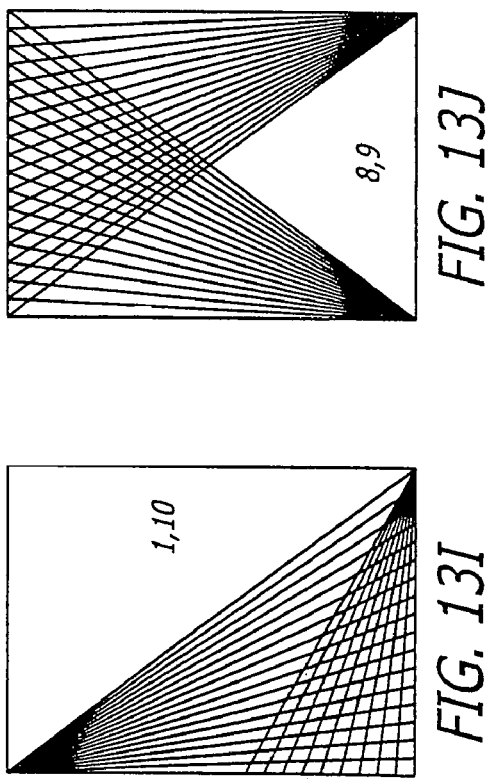
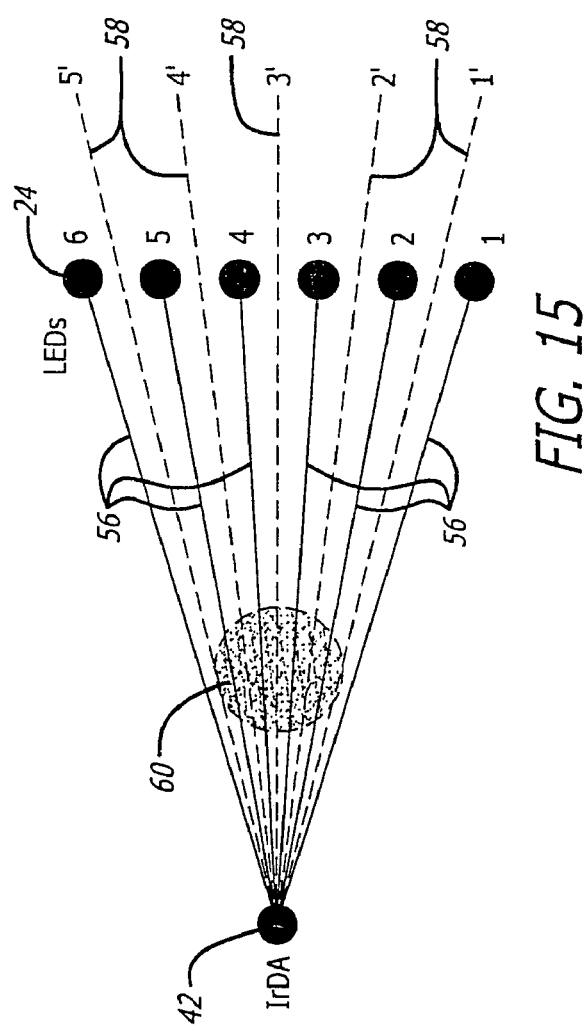

INFRARED TOUCHFRAME SYSTEM

RELATED APPLICATIONS

This application claims the benefit of provisional application Ser. No. 60/369,047, filed Mar. 27, 2002

BACKGROUND OF THE INVENTION

1. Field of the Invention

The invention relates generally to touchframe technology and, more particularly, to systems and methods for detecting a touch event within a touchframe perimeter.

2. Description of the Related Art

The operation of a typical scanning infrared (IR) touchframe system is based on the creation of a grid of invisible IR light beams above the viewing surface of a CRT monitor or flat panel display and the recognition of the location at which individual beams within the grid are interrupted. As shown in FIG. 1, to create such a grid, rows of IR light emitting diodes (LEDs) are paired with opposed rows of phototransistors of IR receivers. Each pair of LEDs and IR receivers constitutes an opto-pair or physical beam. The plurality of pairs create a horizontal (x-axis) and a vertical (y-axis) array of beams. The two arrays of beams and their circuitry make up an opto-matrix touchframe. An IR controller associated with the touchframe sequentially pulses the LEDs to create a grid of IR light beams (depicted as arrow lines). When a stylus, such as a finger, enters the grid, it obstructs the beams thereby resulting in a touch event. One or more of the IR receivers detect the absence of light and transmit signals that identify the X and Y coordinates of the touch event.

As shown in FIG. 2, a touchframe system designed to function with a flat panel is composed of an opto-matrix touchframe, an IR-transparent protective bezel and a transparent filter. To complete the touchframe system, the touchframe is linked to a modular touch controller (not shown) via a modular digital interface (MDI), which is a standard 8-pin telephone-type plug attached to the touchframe by an 8-pin cable.

Since IR touchframe systems operate using the IR portion of light, ambient light in the touch environment, i.e., the area surrounding the touchframe system, has long been a source of concern. Ambient light has varying levels of IR radiation, depending on whether the source of visible light is IR rich, as is sunlight, or IR poor, as is fluorescent light commonly used in offices. Ambient light and other optical noise in the touch environment may cause the touchframe system to provide false readings. For example, noise may cause an IR receiver to provide an output indicative of an unobstructed or connected light beam when the light beam is in fact obstructed or blocked. Conversely, in the presence of noise the IR receiver may provide an output indicative of a blocked light beam when the light beam is in fact connected.

As previously mentioned, the touchframe system sequentially pulses the LEDs to create a grid of IR light beams. A problem with such operation is that infrared light emitted by the sequential, regular pulsing of LEDs may leak into the surrounding environment and inadvertently activate devices which are remotely controllable using infrared remote controls. This can be a significant problem if the touchframe is on a medical devices, such as a ventilator, and it inadvertently activate other medical devices nearby.

Those skilled in the art have recognized a need for a touchframe system that is immune to noise in the touch environment. The need for a touchframe system that does not output interfering IR signals has also been recognized. The invention fulfills these needs and others.

SUMMARY OF THE INVENTION

Briefly, and in general terms, the invention is directed to systems and methods for detecting a touch event within a touchframe perimeter.

In one currently preferred embodiment the invention relates to a touchframe system and method for determining the position of a touch event within a display area. The system includes a plurality of light emitting elements and a plurality of light receiving elements positioned around the perimeter of the display area. Each of the light receiving elements in combination with a plurality of the light emitting elements form a zone of light beam paths. The number and positioning of receivers is sufficient to form a plurality of partially overlapping zone pairs. These zone pairs are arranged relative to the display area such that any touch event lies within at least two zone pairs. The system also includes a processor that is programmed to monitor each of the zone pairs for blockage of at least one light beam path. Upon such blockage, the processor calculates the location of the touch event associated with the blockage based on the slopes and end points of at least two intersecting blocked light beam paths from a first zone pair and two intersecting blocked light beam paths from a second zone pair.

In a preferred detailed aspect of the invention, the processor monitors each of the zone pairs for blockage by randomly activating each of the light emitting elements, one at a time; and monitoring the output of each light receiving element associated with the activated light emitting element for an output indicative of a blocked light beam path. In a further detailed aspect, the light emitting elements are activated at pseudo random intervals and/or in a pseudo random sequence. In another detailed aspect, the light receiving element outputs a signal having a pulse edge upon receipt of light and the processor tags a light beam as blocked in the absence of a pulse edge in the light receiving element output.

In another currently preferred embodiment, the invention relates to systems and methods for determining the location of a touch event within a display area. Similar to the first embodiment, the display area is surrounded by a touch frame having a plurality of light emitting elements and a plurality of light receiving elements. These elements form a plurality of triangular zones of light beam paths each having a slope and endpoints. The number and positioning of receivers is sufficient to form partially overlapping zone pairs. For each of the plurality of triangular zones, the slopes and end points of each light beam path are stored in a memory device. The light emitting elements are activated one at a time in a random order. The output of each light receiving element associated with the activated light emitting element is monitored for blockage of a light beam path. If a blockage is detected, the location of the source of blockage is calculated using the slopes and end points of at least two intersecting blocked light-beam paths.

In a detailed aspect of the invention, monitoring the output of each light receiving element associated with the activated light emitting element for blockage of a light beam path involves comparing the profile of the output to an expected profile having a time-based noise threshold and identifying a light beam as "noise", "connected" or "blocked" accordingly. A beam is considered noise if there is a pulse edge in the profile prior to the noise threshold, connected if there is a pulse edge in the profile after the noise threshold and blocked in all other instances.

In a further detailed aspect, in order to identify a light beam as connected or blocked, the identification of the light beam is counted over successive triggers of the light emitting element associated with the light beam. A light beam is confirmed as being blocked or connected after the counter has reached a specified value, such as at least two successive triggers of the associated light emitting element.

These and other aspects and advantages of the invention will become apparent from the following detailed description and the accompanying drawings which illustrate by way of example the features of the invention.

BRIEF DESCRIPTION OF THE DRAWINGS

FIGS. 13i and 13j depict examples of non-orthogonally overlapping triangular zones;

FIG. 14 is a schematic representation of a touch event occurring within two overlapping triangular zones along with two blocked light beam paths intersecting at the touch event;

FIG. 15 depicts a touch event blocking a plurality of light beam paths; and

FIG. 16 is a schematic representation two blocked light beam paths intersecting at a touch event

DETAILED DESCRIPTION OF THE PREFERRED EMBODIMENTS

Figure 3:
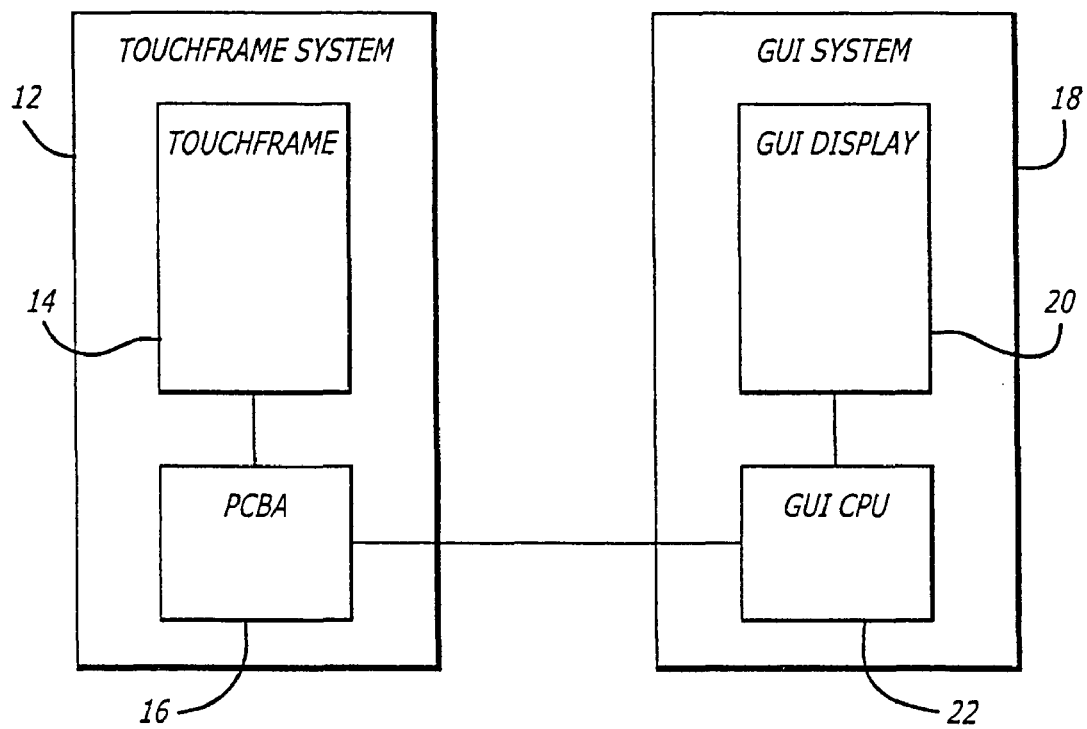
FIG. 3 is a block diagram of a touchframe system configured in accordance with the invention including a touchframe and a printed circuit board assembly (PCBA) interfacing with a graphical user interface (GUI) system.

Referring now to the drawings, which are provided for the purposes of illustration and not by way of limitation, and particularly to FIG. 3, there is shown a system 10 incorporating an infrared touchframe system 12 configured in accordance with the invention and including a touchframe 14 and printed circuit board assembly (PCBA) 16. The system 10 also includes a graphical user interface (GUI) system 18 which includes a GUI display 20 and a GUI central processing unit (CPU) 22. Detailed descriptions of the system architecture and system operation follow.

System Architecture

Figure 4:
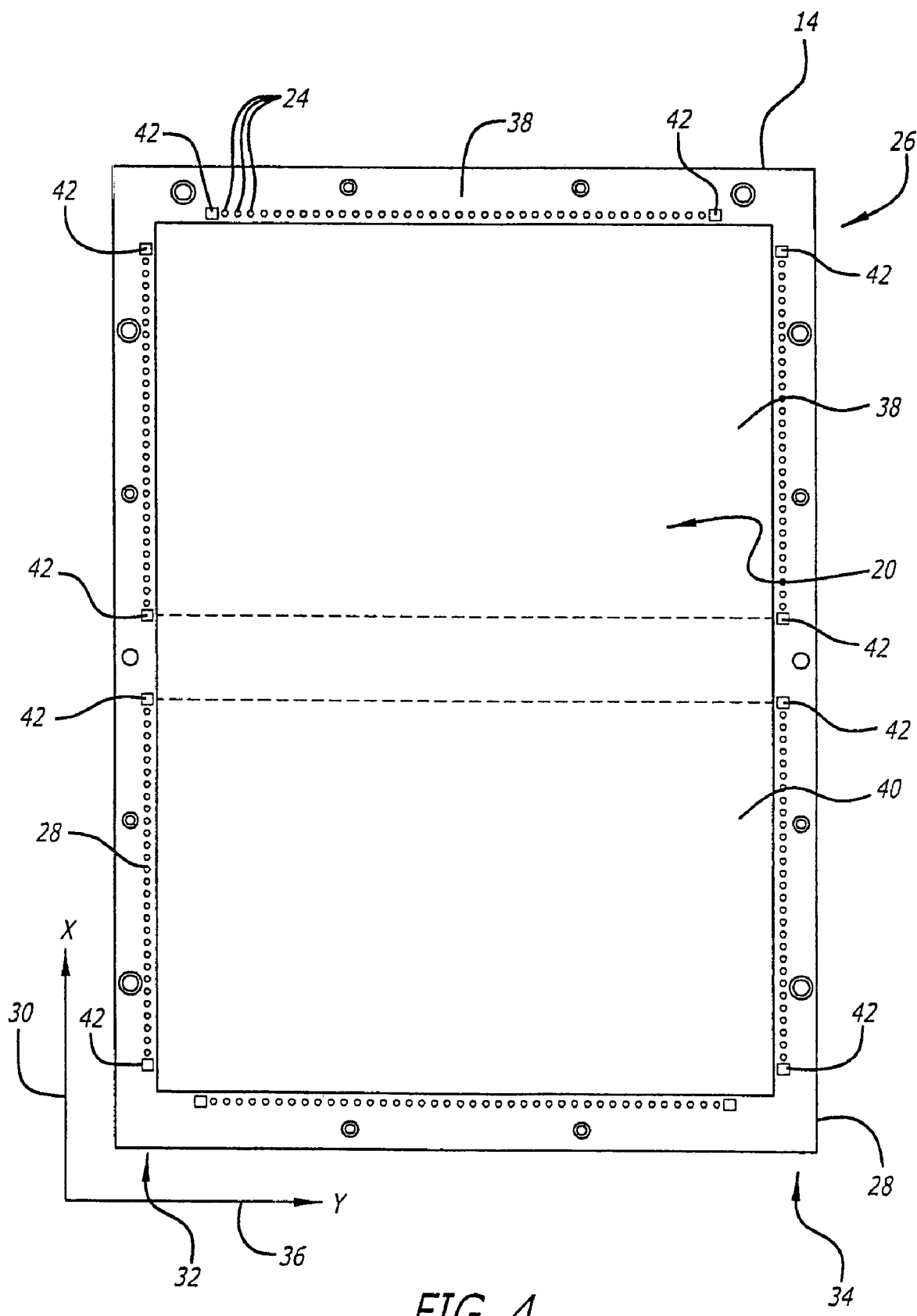
FIG. 4 is a planar view of an exemplary configuration of the touchframe of FIG. 3 including a plurality of LEDs and infrared (IrDA) receiver positioned around the perimeter of a display.

With reference to FIG. 4, the touchframe 14 is mounted to the GUI display 20 such that its perimeter is generally aligned with the perimeter of the GUI display. The purpose of the touchframe system 12 is to detect operator interaction with the GUI display 20 by means of locating the logical X and Y coordinate position of an operator's touch within the touchframe 14 perimeter. The operator's touch may be generated by a finger or mechanical instrument.

With continued reference to FIG. 4, the touchframe 14 includes a plurality of infrared LEDs 24 and a plurality of infrared (IrDA) receivers 42. The infrared LEDs 24 emit light beams to detect touches and operate in the wavelength of the IrDA receivers 42, which in one embodiment is between 850-900 nm. The infrared LEDs 24 are of the surface mount type, such as those manufactured by Stanely (part number DNP1102F), and are positioned around the perimeter of the touchframe 14 in six rows of contiguous LEDs. One row of LEDs 24 is centered across the top 26 of the touchframe, one across the bottom 28 of the touchframe, two on the left side 32 and two on the right side 34.

In an exemplary embodiment, there are thirty-eight LEDs 24 in the top 26 row of LEDs and thirty-eight LEDs in the bottom 28 row of LEDs. These LEDs 24 emit light beams across the large (vertical) X-axis 30 of the touchframe 14. There are fifty-six LEDs 24 along the left side 32 of the touchframe and fifty-six LEDs 24 along the right side 34 of the touchframe. These LEDs 24 emit light beams across the small (horizontal) Y-axis 36. The LEDs 24 on each side of the horizontal axis 36 are functionally separated into two groups of twenty-eight LEDs 24 each, in order to center their light beams respectively on upper 38 and lower 40 LCD displays of the GUI display.

With continued reference to FIG. 4, the surface mount IrDA receivers 42 are positioned around the perimeter of the touchframe 14 in adequate numbers to resolve the output of all infrared LEDs 24. To this end, each of the six rows of contiguous LEDs 24 has two associated IrDA receivers 42, one at each end. The IrDA receivers 42 face the row of LEDs 24 on the opposite side of the touchframe 14 and receive light beams from each of the facing LEDs to detect touches. In one embodiment, the IrDA receivers 42 are special-purpose integrated light detectors produced by Sharp Corporation (part number GP2W001). The IrDA receivers 42 provide a light-detecting element and a signal-processing circuit integrated onto a single chip. The IrDA receivers 42 handle all ambient light rejection and all analog signal processing, producing a low-going digital output pulse whenever they detect a sudden increase in infrared light. They are, in essence, an infrared edge detector.

Each LED 24 is resolved by at least two IrDA receivers 42 to provide redundant operation. The IrDA receivers 42 automatically adapt to variations in ambient light level and operate across a full range of light levels from total darkness to direct sunlight. The IrDA receivers 42 provide a TTL-compatible output signal when illuminated by an LED 24 that has been switched on.

Figure 5:
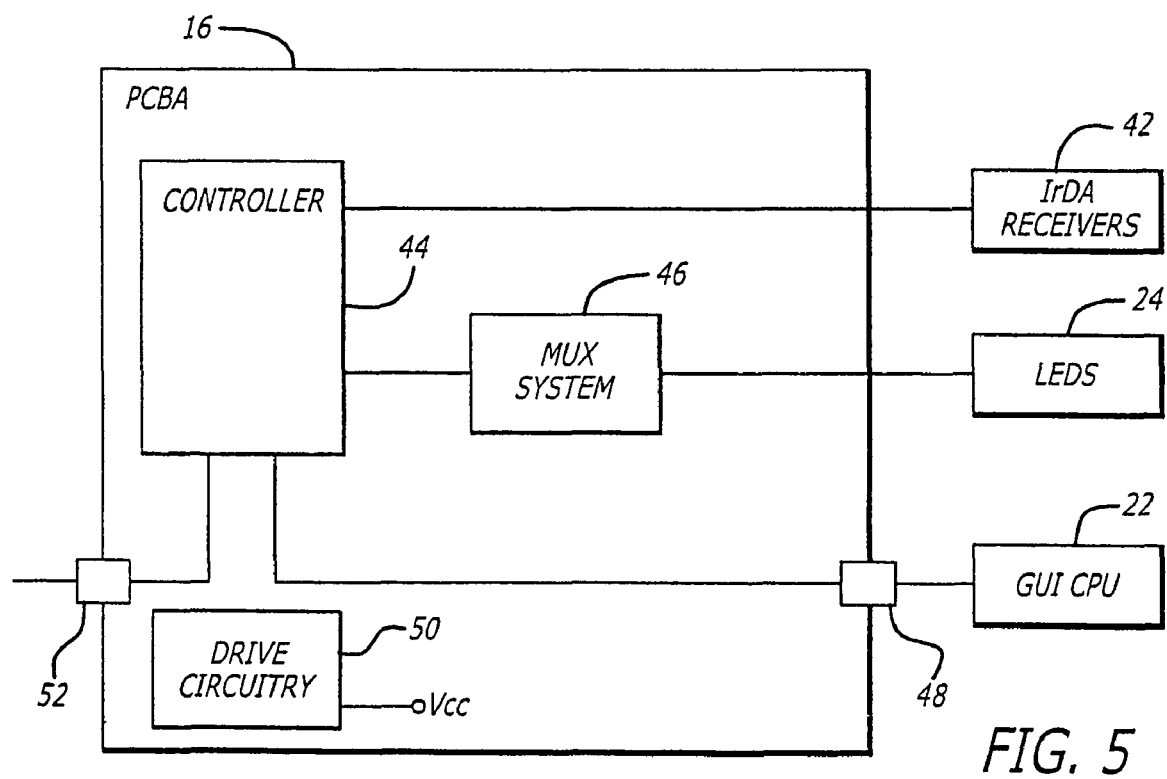
FIG. 5 is a detailed block diagram of the PCBA of FIG. 3 including a controller and multiplexing circuitry.

With reference to FIG. 5, the PCBA 16 includes a controller 44 and a LED multiplexing system 46. The controller 44 is an 8 MHz or faster RISC architecture controller with at least thirty-two programmable I/O lines. One such controller is the Atmel AVR AT90S8515. The PCBA 16 also includes 8 KB of FLASH memory, 512 bytes of local high speed SRAM memory, 512 bytes of EEPROM, a 16-bit counter/timer, a watchdog timer, a full duplex on chip UART that may utilize two of the I/O lines as a serial I/O port and a programming port that enables in-system programming of the controller 44 program memory.

The LED multiplexing system 46 includes a network of multiplexers and column drivers that form a multiplexing matrix comprised of rows and columns. Such a matrix is necessary in view of there being more LEDs 24 to operate than there are controller 44 output pins. The LED multiplexing system 46 expands the input/output capability of the controller 44 in order to allow for individual activation of the LEDs 24. Each LED 24 is independently addressable by the controller 44 such that only one LED is illuminated at a time. The LEDs 24 are addressed by writing an 8-bit LED identifier to an output port of the controller 44. An LED address is comprised of a 4-bit row identifier and a 4-bit column identifier. Combined, these identifiers serve to address one of up to 256 possible logical LEDs 24 in the touchframe. Row and column identifiers may be assigned to upper or lower 4-bit fields of the output port. Merely writing the LED row and column address to the controller 44 output port does not activate an LED 24. Two output pins, a row strobe and a column strobe are asserted to activate an LED 24.

The PCBA 16 also includes an eight pin, asynchronous TTL-compatible serial communication port 48 for passing data back and forth between the GUI CPU 22 and the PCBA 16, driving hardware 50 for providing a single 5V power supply, VCC, to operate the PCBA circuitry and an in-system programming port 52 that provides for external uploading and downloading of touchframe operating firmware into the controller 44.

Touchframe Geometry

While the IrDA receivers 42 used in the touchframe system avoid many of the analog problems associated with the receivers of prior art systems, and handle ambient light variations extremely well, they are relatively expensive. Therefore, it is cost prohibitive to have a one-to-one ratio between LEDs and infrared receivers as is used in prior art touchframe systems. Accordingly, the touchframe system of the invention uses a greater number of LEDs and fewer receivers than the prior art systems.

Figure 6:
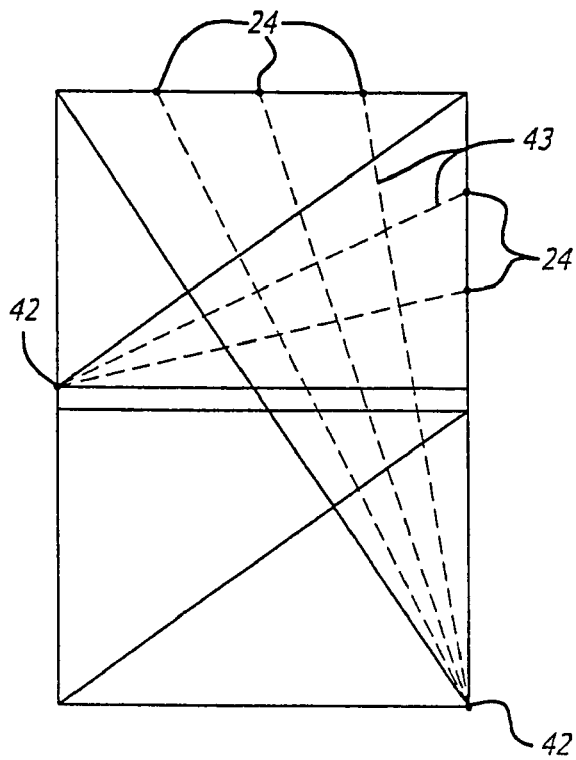
FIG. 6 depicts two rows of LEDs each with an associated IrDA receiver forming overlapping triangular zones of light beam paths.
Figure 7:
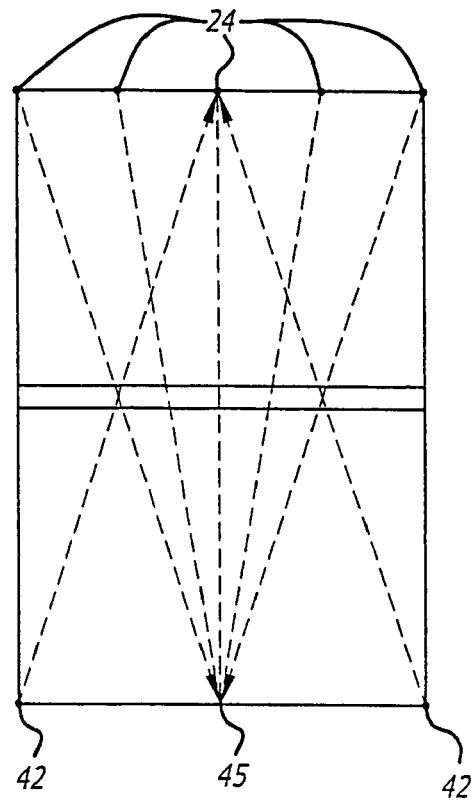
FIG. 7 depicts the directional alignment of a row of LEDs and two opposed IrDA receivers.
Figure 10:
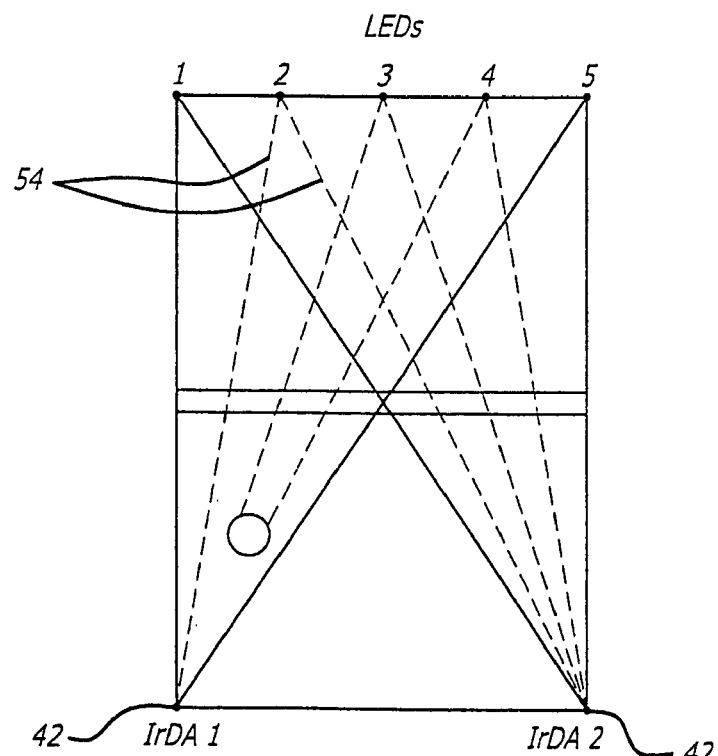
FIG. 10 is a schematic representation of two triangular zones of light beam paths formed by the row of LEDs and the IrDA receivers of FIG. 7 with a touch event blocking some of the light beam paths.

With reference to FIG. 6, the LEDs 24 and IrDA receivers 42 are arranged such that the light beam paths 43 defined by each LED 24 and its associated IrDA receivers 42 form an intersecting pattern of triangular zones that provide coverage of the entire screen area. In FIG. 6, and FIGS. 7 and 10, not all LEDs and IrDA receivers are shown in order to preserve clarity of illustration. Because the intersecting light beam paths or lines that result cross at many different angles, the controller 44 is programmed to execute a mathematical coordinate conversion step that translates to the conventional X/Y coordinate system expected by the GUI CPU 22. Coordinate conversion involves some rounding and approximation.

With reference to FIG. 7, two factors determine the ratio of the number of LEDs 24 to the number of IrDA receivers 42: the useful angle of light dispersion from the LEDs and the acceptance angle of the IrDA receiver. These dispersion and acceptance angles of the LEDs 24 and IrDA receivers 42 are limited. Both types of components have lenses in front of the active electro-optical elements designed to concentrate the light beam energy into a confined range. If all LEDs 24 on one side of the touchframe communicated only with a single IrDA receiver 42, they could simply be aimed at that receiver. However, in accordance with a redundancy feature of the invention, each LED 24 on one side of the frame triggers two IrDA receivers 42 on the opposite side of the touchframe. Therefore, the LEDs 24 are aimed at the midpoint 45 between the two IrDA receivers 42 on the opposite side. Likewise, since each IrDA receiver 42 communicates with all of the LEDs 24 on the opposite side of the touchframe, each IrDA receiver is aimed at the midpoint of the LED row on the opposite side.

Logic and Scanning

Figure 8:
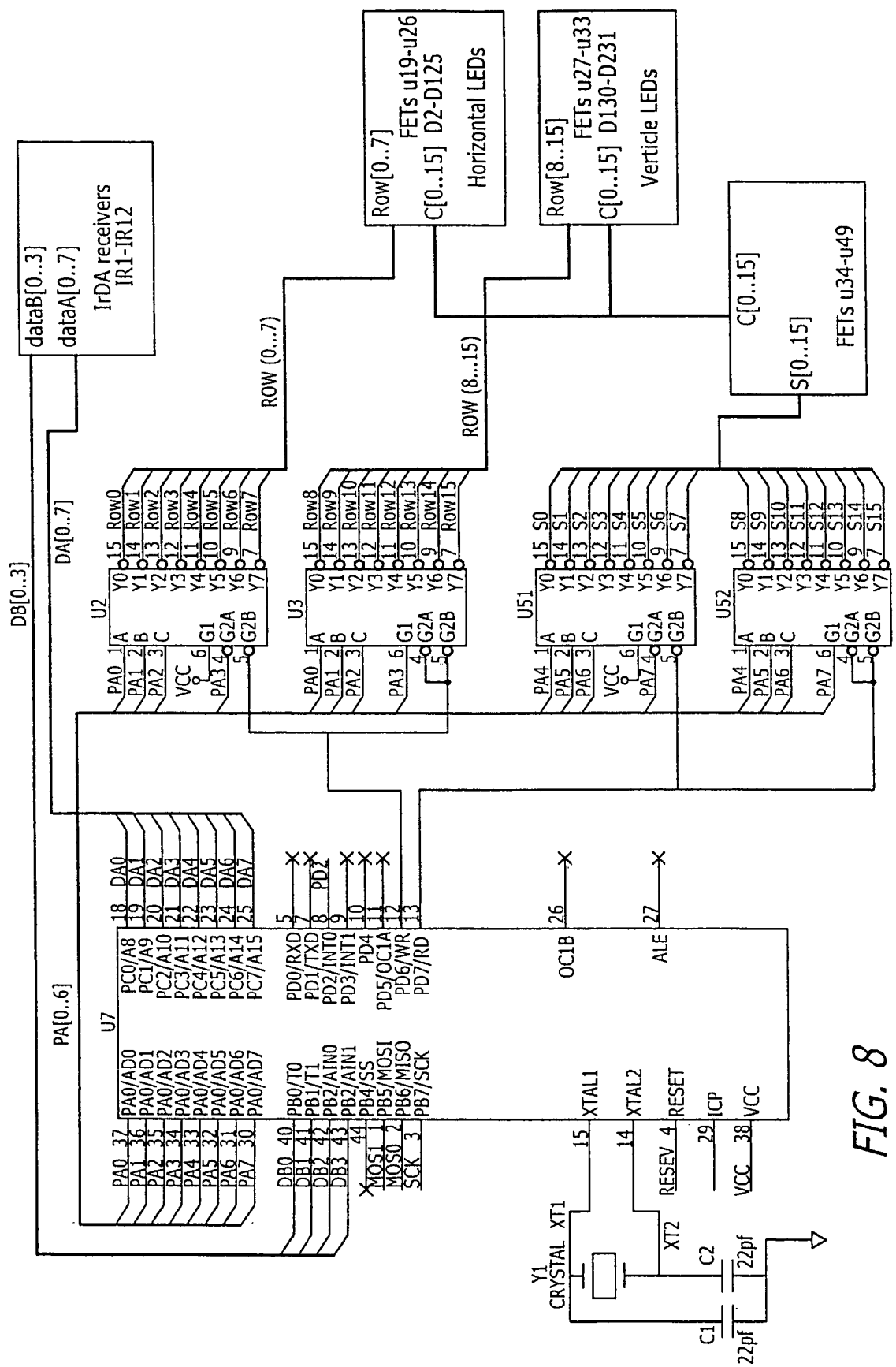
FIG. 8 is a schematic of the controller and multiplexing system of FIG. 3.

With reference to FIG. 8, operation of the touchframe system is controlled by the 8 Mhz RISC controller U7. Twelve IrDA receivers (IR1-IR12) are directly connected to controller input port bits DA0-DA7, DB0-DB3. Although the horizontal LEDs D2-D125 and vertical LEDs D130-D231 are arranged in rows around the periphery of the touchframe, a logical 16×16 output matrix controls all of the LEDs in the system. Standard three-to-eight line decoders U2,U3,U51, U52 implement the matrix, but not all rows and columns of the matrix are needed.

In accordance with the invention, only one LED 24 is switched on at a time. The controller U7 turns an LED on by selecting one row and one column and then enabling the output matrix. As soon as the LED is turned on, the controller U7 begins a high-speed sampling of the results by examining the output pulse from the logically associated IrDA receiver IR1-IR12.

Thirty-two samples are taken at ⅛th microsecond intervals and a profile of the IrDA receiver output (if any) is compiled and stored in memory. This scanning occurs at the highest priority processor interrupt level (internally timer-driven) so that it is guaranteed not to be interrupted. The "output profile" is roughly analogous to an oscilloscope trace. It is a time-record of the output waveform from the IrDA receiver. As described further below, a touchframe firmware optical noise immunity algorithm evaluates the profile. The algorithm looks to see if the pulse present in the output profile began too soon—indicating that some optical noise other than the LED beam triggered the IrDA receiver—or else if the pulse width is too short or non-existent, indicating that the beam is blocked.

The beam may appear to be blocked for several possible reasons, i.e., it may be blocked by a finger or stylus, which is normal operation, or it may be blocked by debris or some other obstacle, or it may indicate a burned out LED 24 or burned out IrDA receiver 42. Other "layers" of the firmware evaluate the difference among these possibilities and take appropriate action.

The memory profile of the IrDA receiver 42 is very transient—it is only used to evaluate the quality of the firing of a single beam from a selected LED 24. Once the evaluation is complete, the resulting information is stored in a more compact form in a state machine associated with the particular logical beam. The profile itself is overwritten immediately, and a short time later the beam of the next selected LED 24 is profiled and evaluated.

LED Drivers

With continued reference to FIG. 8, dual field effect transistors (FETs) U19-U49 are arranged in a push-pull arrangement to avoid having any rows or columns of the matrix float. This provides clean switching transitions, preventing spurious LED outputs. As previously mentioned, only one LED 24 is illuminated at a time.

Optical Noise Immunity

The touchframe firmware optical noise immunity performs a "sanity check" on each input received by the controller 44 from an IrDA receiver 42 by comparing the actual input profile, i.e., the output profile of the IrDA receiver, with an expected input profile. There is a three-state logic applied. Each beam is treated as being in one of three instantaneous states: Connected, Blocked, or Noise. A beam evaluated as Noise does not affect the state counter. A beam evaluated as Connected or Blocked moves the state counter in the direction of more connected or more blocked, up to a predetermined limit. This provides some hysteresis in transitions between Connected and Blocked states as seen by the next level of system firmware. Furthermore, as described in detail later, a state counter is used to "de-bounce" the beam state.

Figure 9:
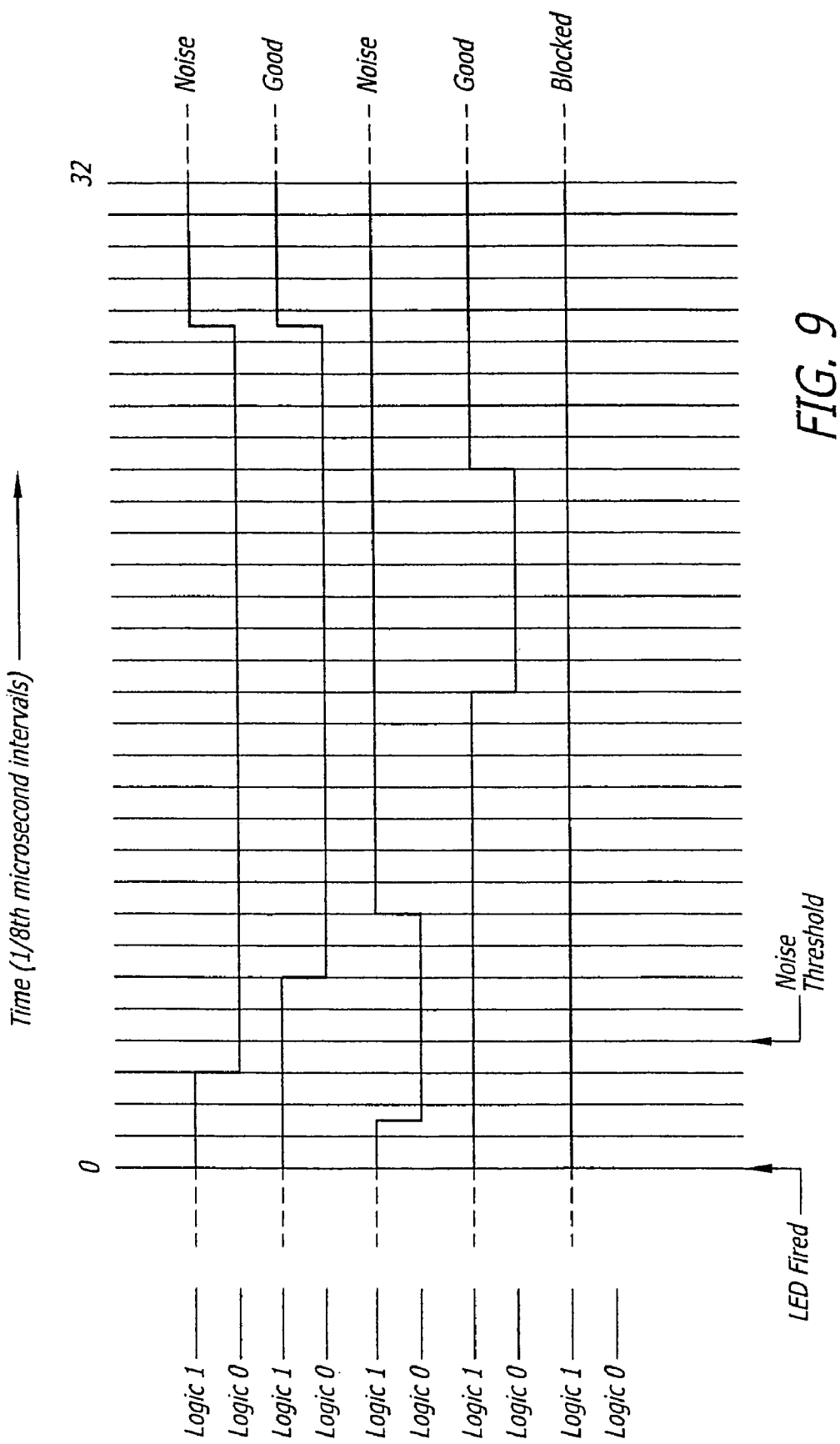
FIG. 9 is a timing diagram illustrating the optical noise immunity feature of the touchframe system.
Figure 11:
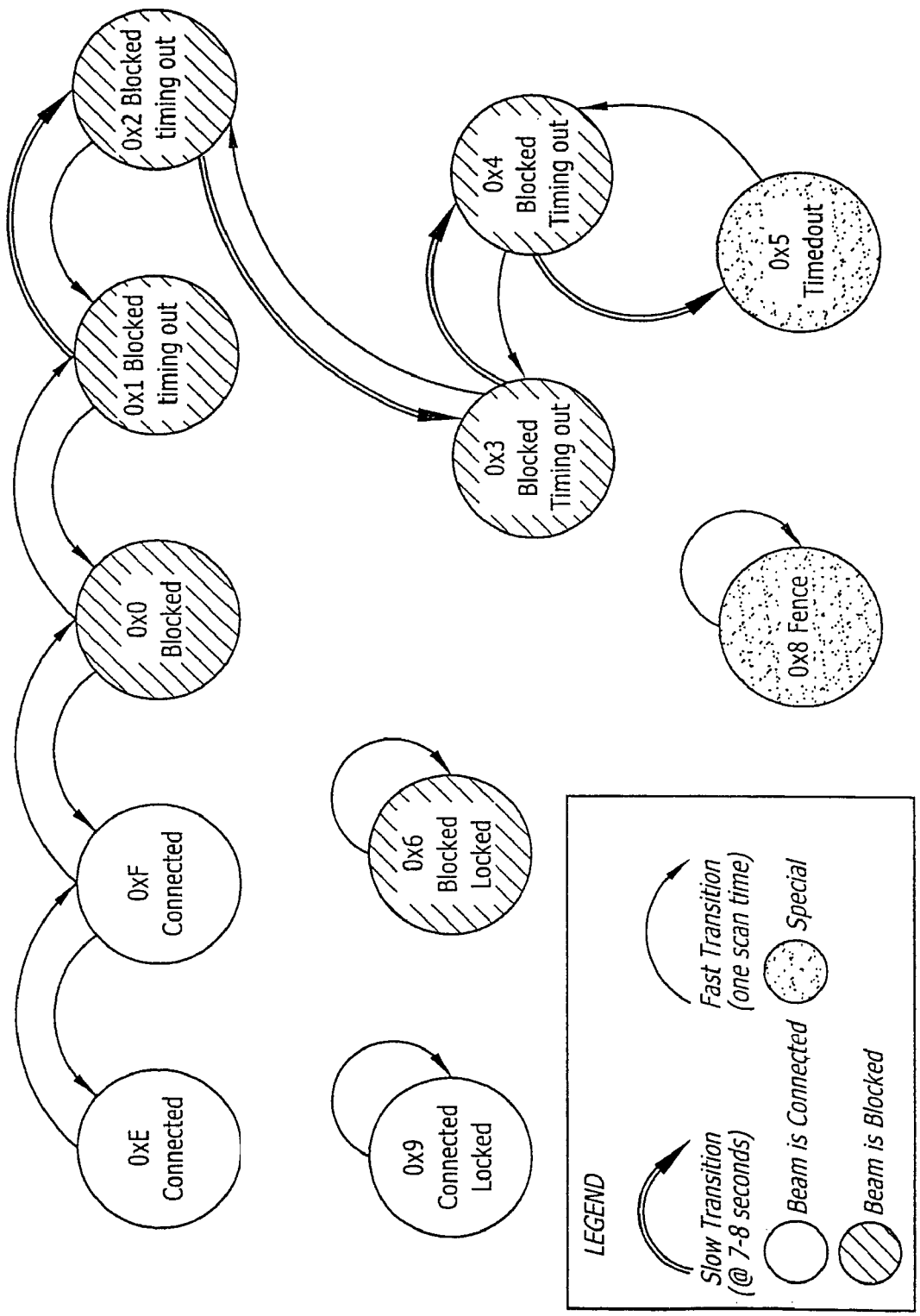
FIG. 11 is a state diagram illustrating the progression of state values used by the touchframe system to determine whether a light beam is blocked or connected.
Figure 12A:
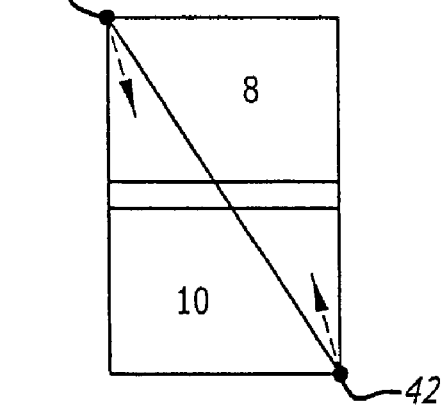
FIGS. 12a through 12d are schematic representations of twelve triangular zones formed by the LED rows and IrDA receivers of FIG. 4.
Figure 12B:
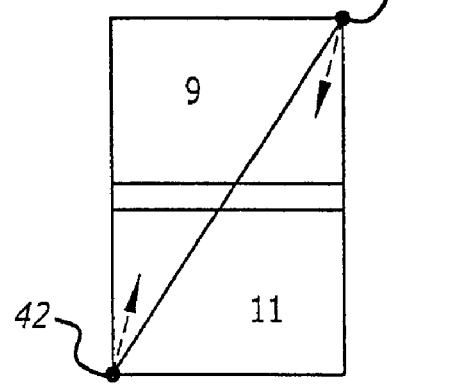
Figure 12C:
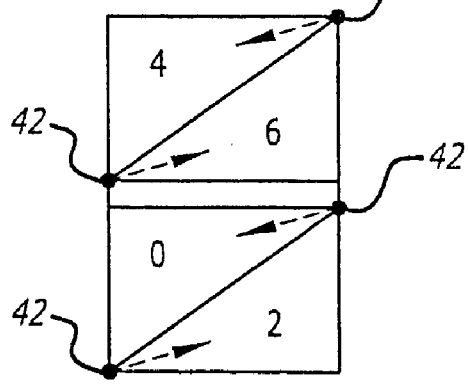
Figure 12D:
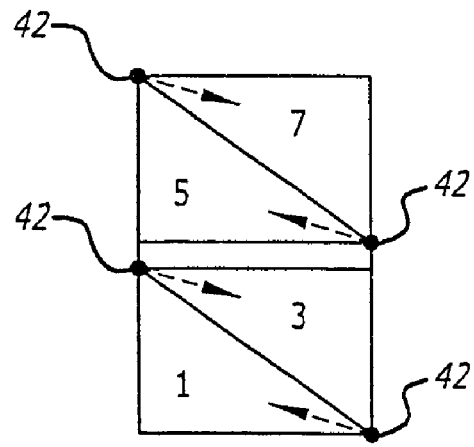
Figure 13D:
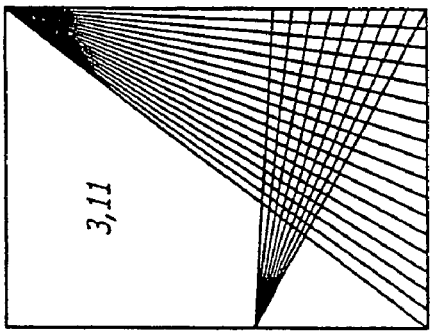
FIGS. 13a through 13d depict four sets of orthogonally overlapping zones which collectively cover the lower portion of the display of FIG. 4.
Figure 13H:
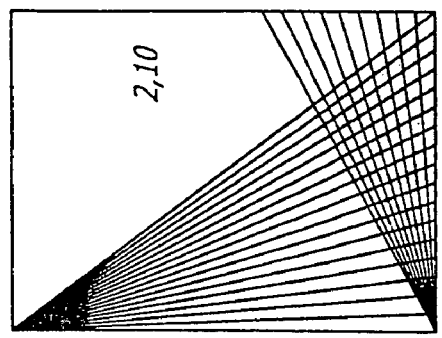
FIGS. 13e through 13h depict another four sets of orthogonally overlapping zones which collectively cover the lower portion of the display of FIG. 4.
Figure 13C:
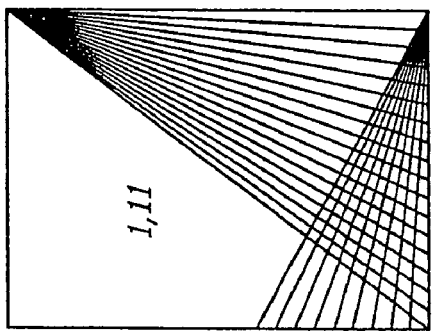
Figure 13G:
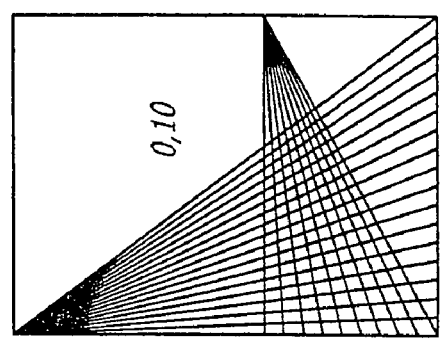
Figure 13B:
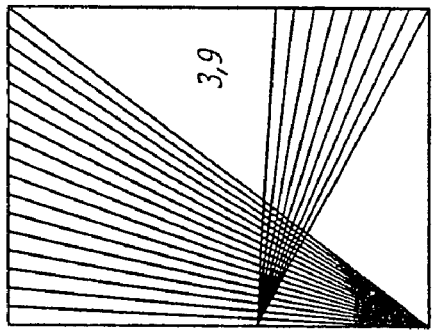
Figure 13F:
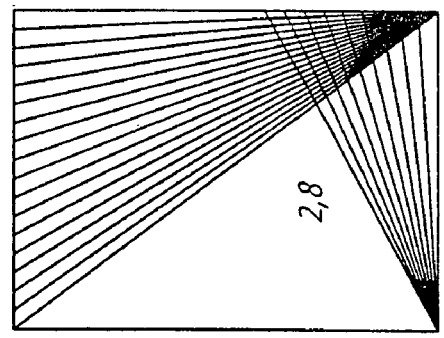
Figure 13A:
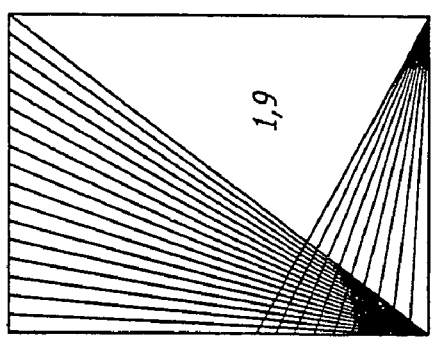
Figure 13E:
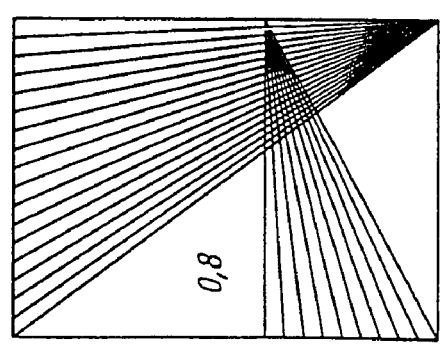

With reference to FIG. 9, wherein the scale from left to right represents a time period of four microseconds subdivided into ⅛th microsecond intervals, each ⅛th microsecond the controller 44 fires one of the LEDs 24 in the array and then immediately begins to sample the output from the associated IrDA receiver 42. There is an aggregate delay that includes propagation delay from the controller 44 through the MUXing logic, time required to switch on the LED 24, time the IrDA receiver 42 takes to respond to the increase in light and time required for the output to propagate back to the controller. Finally the signal is logged internally by the controller 44. If, however, a signal is detected before an adequate amount of time has passed, the noise rejection algorithm assumes that some external source of light other than the LED 24 that was fired caused the IrDA receiver 42 to trigger. Waveforms of five example beams considered Noise, Good, or Blocked are illustrated.

A beam is rejected as Noise if there is an output pulse edge present in the profile at a time earlier than is expected, i.e. earlier than the IrDA receiver 42 response time would allow. This time is noted as the "noise threshold." A beam is accepted as Connected only if the pulse edge occurs after the noise threshold and pulse width is a reasonable length All other beams are considered Blocked.

It is highly unlikely that in any normal environment there would be infrared noise of sufficient intensity and duration that would interfere with the operation of the touchframe system. Infrared noise of such magnitude would block the operation of any conceivable infrared touchframe technology. The touchframe optical noise immunity feature of the invention has been tested by observing operational output in the presence of infrared noise generated by various remote control devices.

Minimizing Optical Noise Emission

As previously mention, prior art touchframe systems may interfere with external infrared receivers, such as those in a TV receiver. In order to avoid the possibility of the touchframe system interfering with such external infrared receivers, the controller 44 is programmed to activate LEDs 24 at pseudo random intervals and in a pseudo random sequence. This causes any infrared pulses that may stray into the environment to appear to be "noise" to any other infrared actuated device.

Error Handling and Redundancy

Each touchframe system begins life fully operational as guaranteed by in-circuit test. The in-circuit test fixture may also load code into the touchframe system controller 44, which is FLASH-based. No adjustments or calibration are needed. The touchframe system is designed to accommodate the full range of possible component tolerances and ambient lighting conditions.

The touchframe system constantly tests itself by firing and detecting infrared beams. When a beam is blocked for an extended period of time the software state counter toggles into a Long Term Blocked state and that beam receives special software handling. This extended period of time maybe set in the touchframe firmware and may be, for example, approximately 30 seconds.

As previously described with reference to FIG. 4, the touchframe has six rows of LEDs. Each row faces a pair of IrDA receivers 42 at the opposite side of the touchframe. The presence of pairs of IrDA receivers 42 provides the touchframe system a level of redundancy. Firmware algorithms use this redundancy to determine whether a blocked beam is permanently disabled due to a faulty LED 24.

If both IrDA receivers 42 associated with an activated LED 24 provide an output profile indicative of a blocked light beam path, then the LED is likely faulty based on the premise that only one of the two light beam paths between an activated LED and its two associated IrDA receivers should be blocked at a time. The distance between the two associated IrDA receivers 42 and the assumption that the touch event is far enough away from the activated LED so as not to block both light beam paths support the premise. Cases where the touch event is close enough to the activated LED 24 to block both light beam paths are noted by the firmware through the blockage of both light beam paths of adjacent LEDs. If the LED appears to be permanently disabled, it is possible to report the error but still continue near-normal operation with the remaining functional LEDs.

System Operation

Power-On Self-Test (POST)

Upon reset of the touchframe system, the touchframe firmware does some basic housekeeping by setting up the stack pointer to point to the end of the SRAM. It then clears the SRAM to make it easier to examine stack behavior in case of debugging.

Power-On Self Test then begins by forming a register "bucket brigade", shifting a couple of known patterns from register to register and verifying that the registers are able to store and recall the patterns correctly. Next, a CRC test is performed on the FLASH memory. CRC is a special checksumming algorithm that is substantially better than additive checksums at detecting errors in a long byte sequence. Finally, an SRAM Nair test is performed to prove the ability of the SRAM fabric to store and recall data correctly.

Initialization

The next task for the touchframe firmware is to initialize internal data structures in preparation for start of operations. The largest data structure is an array of beam state variables. With reference to FIG. 10, each LED 24 forms two logical geometric light beams 54 because each LED is detected by two IrDA receivers 42. It is possible, and very likely, that one of the two receivers 42 may "see" the beam from a particular LED 24 while the other receiver is blocked. For example, beams from LEDs 3 and 4 are blocked to the view of IrDA 1 but visible to the view of IrDA 2. A logical LED beam 54 is defined by both the LED 24 and the IrDA receiver 42.

Next the touchframe firmware initializes the internal processor timer Y1 (FIG. 8) used to generate the fundamental timed interrupt that regulates touchframe system behavior. This timer is initialized to a period of 100 us, which means that as many as 800 processor instructions may be executed during each timer "tick".

The internal processor UART 48 is initialized to a rate of 19.2 Kbaud. Various I/O ports are initialized to a benign state, interrupts are unmasked and globally enabled, and assorted variables are initialized. Finally, the built-in processor watchdog is synchronized and enabled, and processor execution enters its main operational loop.

Main Operational Loop

The main execution path for the touchframe system is comprised of three major actions; 1) checking for and responding to commands from the GUI CPU 22, 2) checking for blocked beams in sets of pairs of overlapping triangles, and 3) coordinate converting and averaging the results of any blockage.

GUI Command Decoder

The touchframe system detects and responds to a predefined set of commands that the GUI CPU 22 issues asynchronously from time to time. For example, the GUI CPU 22 may send the status requests to the touchframe system at ten-second intervals. Upon receiving a status request, the touchframe system gathers any error information, e.g., beams blocked for more than an acceptable period of time, and formats that information into a message to send back to the GUI CPU 22.

Commands from the GUI CPU 22 to the PCBA 16 are single 8-bit characters. Responses from the PCBA 16 to the GUI CPU 22 are composed of multiple 8-bit characters. Each response begins with a response-type character, followed by one or more data characters, and ends with a termination character of 0xFF. The PCBA 16 originates two response types unsolicited by a GUI CPU 22 command. These responses are Touch and Release events.

Touch Event: 0xFE, 0xXX, 0xYY, 0xFF
Release Event: 0xFD, 0xXX, 0xYY, 0xFF
 where 0xXX represents the 8-bit X coordinate of the touch and 0xYY represents the 8-bit Y coordinate.

All other responses occur only when replying to a command from the GUI CPU 22. For example, the GUI CPU 22 may request an error report or touchframe system firmware version information.

Error Report Command: 0x32—Response: 0xF8, 0xNN, 0xEE, . . . 0xEE, 0xFF
 where 0xNN is the number of errors being reported, and 0xEE . . . 0xEE are the error codes (if any). If there are no errors whatsoever, the response is: 0xF8, 0x00, 0xFF.
 Possible error codes are:
  0x01—FLASH checksum error detected.
  0x02—SRAM error detected.
  0x03—Processor error detected.
  0x04—Failed beam(s) detected.
  0x08—UART error detected.
  0x09—Serial overrun error detected.
  0x0A—Invalid Command received.]
Get Version Command: 0x34—Response: 0xF6, 0xNN, "04-076530-85-X-", "0000", 0xFF]
 where 0xNN is the number of versions being reported (for backward compatibility—always 0x01), and X is a revision letter specifying the version of the Touchframe firmware. The version string (in quotes) is located in FLASH memory starting at address 0x2E0 for access by ICT. It is followed by four zeros ("0000", each a 0x30) and then the usual 0xFF message termination.

Software Reset Command: 0x3C—Response: System resets and firmware execution starts over.

Beam Triangle Pair Detection

The touchframe system monitors pairs of triangular zones. Each triangular zone is comprised of a row of LEDs 24 and a facing IrDA receiver 42. If beams from each of the overlapping triangular zones are blocked, that triangular zone pair is flagged for later processing.

Coordinate Conversion and Averaging

The touchframe controller 44 converts overlapping sloped beams into an orthogonal Cartesian coordinate system. This information is gathered and formatted, as described above, into touch event messages which are sent to the GUI CPU 22 asynchronously whenever they occur.

Task Structure and Interrupts

There are two basic threads of operation in the touchframe system: 1) the mainline thread executed in the main operational loop and 2) the interrupt thread executed periodically on the basis of timed interrupts.

The mainline thread generally takes care of things that are not highly timing dependent and that may be interrupted without serious effect. The interrupt thread takes care of timing and particularly low-level beam detection, which is timing dependent.

Low-level Beam Detection

Every 100 us a timer-driven interrupt occurs. The next LED 24 out of the endlessly repeating pseudo-random series of LEDs is selected. The LED multiplexing system 46 logic is set up and the selected LED 24 is turned on. As previously mentioned, immediately after the selected LED 24 is turned on, thirty-two sequential samples of the IrDA receiver 42 outputs are taken at ⅛th microsecond intervals. Outputs from both of the IrDA receivers 42 associated with the selected LED 24 are recorded and analyzed by the previously describe touchframe firmware optical noise immunity algorithm to determine if the beam is Noise, Connected or Blocked.

Beam State Counters

There is a four-bit state counter associated with each LED/IrDa receiver pair. This counter serves the purpose of low-level debouncing and noise rejection. The associated algorithm allows for a certain amount of hysteresis. A particular LED beam must be observed by the system to be in a new state, i.e., blocked or connected, for at least two samples in a row before it is accepted as having transitioned to that state.

Figure 1:
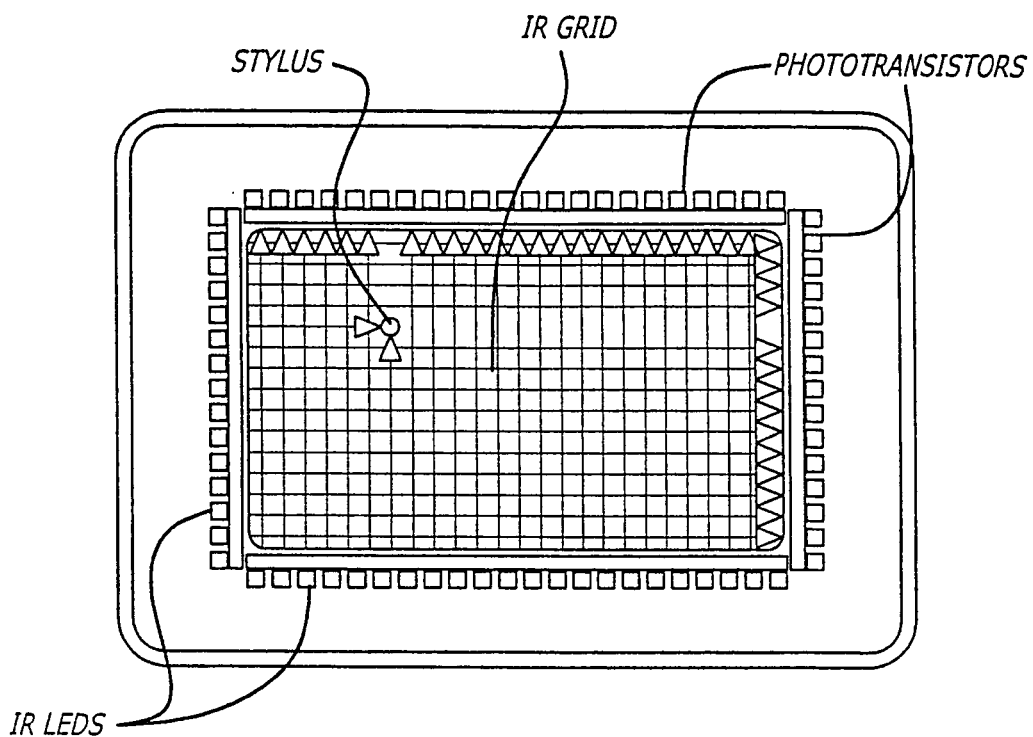
FIG. 1 is a planar view of a prior art touchframe system including a plurality of infrared (IR) light emitting diodes (LED) and phototransistor pairs arranged around a detection area display to form an IR grid.
Figure 2:
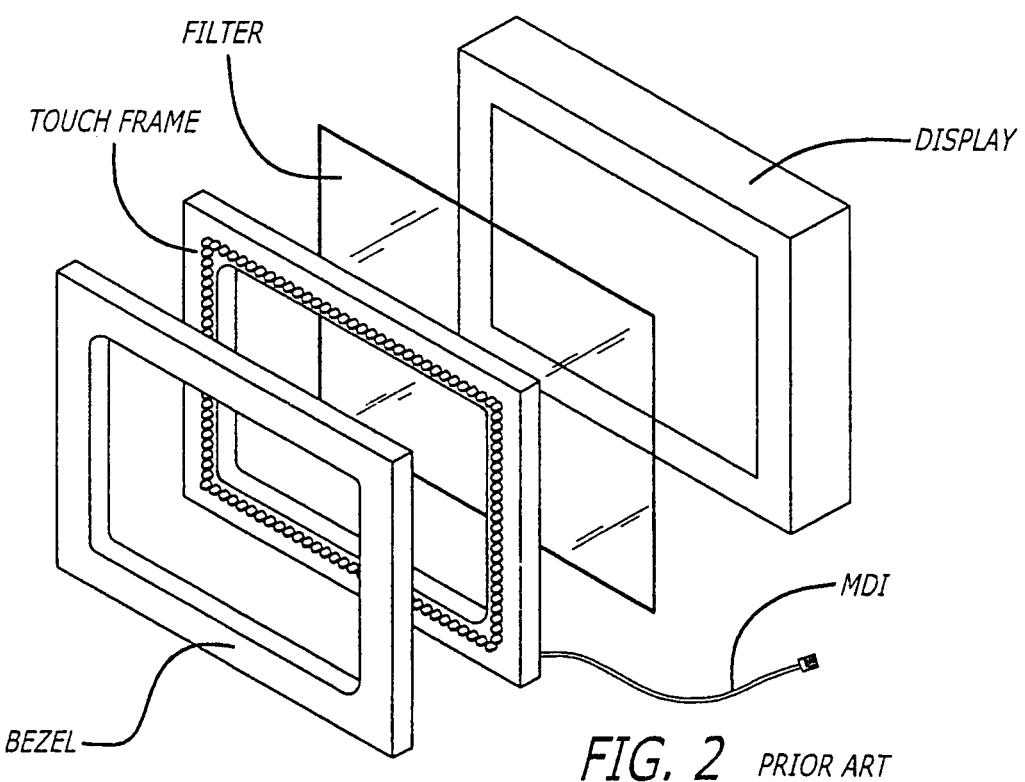
FIG. 2 is an isometric view of the touchframe system of FIG. 1.

More specifically, with reference to FIG. 1, the most significant bit of the state value defines whether the beam is connected (1) or blocked (0). The "normal" state is connected, i.e., no finger or stylus blocking the beam. When a touch occurs, it takes two scan times to advance the state machine from 0xE to 0x0, a "blocked" state. In the blocked state, higher-level algorithms act on the information if there are two crossed blocked beams. Transitions from state 0x1 to 0x5 occur more slowly. When state 0x5 is reached, the beam is considered to be "timed-out". This means that the higher-level algorithms report a "blocked-beam" error to the host. They also treat the beam in a special way—considering it "blocked" if it is in the middle of a run of blocked beams, or else treating it as "connected" if it is not adjacent to genuinely blocked beams. The "fence" states are not actually beams, but rather act as boundaries for rows of beams. The fences are preset when memory is initialized and never change during touchframe operation. Locked beams are logical states that may be used to implement special error handling algorithms.

Overlapping Triangular Zone Geometry

With reference to FIGS. 12a through 12d, in one embodiment of the touchframe system there are twelve arbitrarily numbered triangular zones in the touchframe geometry. Each represents a set of infrared LEDs (not shown) and a single IrDA receiver 42. The IrDA receiver 42 is at the apex of the triangle where the logical beams formed by the IrDA receiver and the LEDs converge. The arrows in the figures indicate which direction the IrDA receivers 42 are looking. While many overlapping combinations of triangles could be devised, in a preferred embodiment of the invention, only sixteen of the possible overlapping pairs are used.

With reference to FIGS. 13a through 13j, the zone pairs are selected to provide coverage of the GUI display. The first four combinations (FIGS. 13a through 13d) are one way of covering the lower half of the screen. The second four combinations (FIGS. 13e through 13h) are an alternate, redundant way of covering the lower half of the screen. The first four combinations and the second four combinations each use four different IrDA receivers 42. The last two combinations (FIGS. 13i and 13j) are two examples of unused pairs of overlapping triangles. These pairs of overlapping horizontal and vertical triangular zones and others like them are not used in the calculation process because the overlapping lines are not as perpendicular to each other as lines in other pairs, as shown in FIGS. 13a-13h. A similar set of eight combination pairs is used to provide coverage of the upper half of the GUI display.

A touch event in a triangular zone defines a particular light beam path or line having a particular slope and a particular endpoint. For example, as shown in FIG. 14, intersecting lines in triangular zones 6 and 8 are illustrated by the dotted lines. Depending on its location, a touch lies within at least one horizontal triangular zone and at least one vertical triangular zone.

In accordance with the invention, pairs of the most orthogonally overlapping zones, such as those shown in FIGS. 13a-13h, are selected by the controller 44 firmware and inspected for blocked light beam paths or lines that intersect. The pairs of triangles with beams that intersect at angles closer to 90 degrees are the pairs used for calculating the position of the touch. With reference to FIG. 14, the touch 70 lies entirely within horizontal zones 6 and 7 and vertical zone 8. Zones 6 and 8 form a more orthogonal pair of overlapping triangular zones than zones 7 and 8. Accordingly, the light beam paths or lines within these zones are examined for blockage. The location of the touch 70 is calculated using two intersecting lines 72, 74, one from each of the selected triangular zones. The intersecting lines 72, 74 selected for such calculation are those lines which are closest to perpendicular.

Virtual Beams

By simple geometric logic, it is possible to detect positions in between hardware-defined beams. With reference to FIG. 15, a triangular zone has six beams 56 defined by six LEDs 24 and an IrDA receiver 42. Five additional "virtual beams" 58 are defined (1'-5'), each one midway between adjacent hardware beams 56. Depending on which hardware beams 56 are blocked, either a hardware beam or a virtual beam is identified as the "centroid", or central logical beam to be used in calculating the touch position. If an odd number of hardware beams 56 are blocked, the center hardware beam is the output. However, if an even number of hardware beams 56 is blocked, a virtual beam 58 in between the two central hardware beams is the output. For example, in FIG. 15, a finger 60 blocks beams 2, 3, 4, and 5. The touchframe firmware then identifies a virtual beam 58 between beams 3 and 4 (labeled 3') and registers that as the output for this triangular zone.

Slope and Endpoint Tables and Refraction

There is not enough memory space in the PCBA 16 to accommodate an exhaustive table lookup for translating the coordinates of intersecting beam pairs into a Cartesian coordinate system. However, the geometric arrangement of the LEDs 24 and IrDA receivers 42 is very regular and symmetrical. Consequently, it is possible to use only two tables along with some mathematical "mirroring" to define the slopes of LED beams comprising all twelve triangular zones. One table defines the slopes of all LED beams comprising the horizontal triangles and another table defines the slopes of all LED beams comprising the vertical triangles. Horizontal triangles are those triangles comprised of a left side 32 (FIG. 4) or right side 34 row of LEDs and their associated IrDA receivers 42 on the opposite sides. Vertical triangles are those triangles comprised of a top 26 or bottom 28 row of LEDs and their associated IrDA receivers 42 on the opposite side.

There is a third table that specifies the endpoints of all the lines in all the triangles. Because all lines in each triangle converge on a single point, i.e. the IrDA receiver 42 for that triangle, there are only twelve entries in the endpoint table.

As light travels from a particular LED 24 to its corresponding IrDA receiver 42, it must pass through the infrared filter bezel that seals and protects the PCBA 16 from the external environment. As it does so, it is refracted to varying degrees depending on the angle of the particular light path and the thickness, angle, and refractive index of the bezel. The effects of this refraction have been calculated and compensated for to the greatest degree possible. The results of this compensation are entirely represented in the data entries in the slope and endpoint tables.

Floating Point Algorithms

When touch events in overlapping triangular zones occur, the touchframe firmware translates those coordinates to Cartesian coordinates using floating point mathematics. As shown in FIG. 16, the fundamental equation involved calculates an X/Y output coordinate corresponding to the intersection 62 of two sloped lines 64, 66. The essential elements input to the equation are the slope and one endpoint for each of the two intersecting lines.

The following is a representation in the 'C' programming language of the floating point coordinate conversion algorithm:

```
float line1_x1,line1_y1; // End one of first line
float line1_x2,line1_y2; // End two of first line
float line2_x1,line2_y1; // End one of second line
float line2_x2,line2_y2; // End two of second line
float xi,yi; // Coordinates of intersection
void convert(void)
{
```

-continued

```
float slope1,slope2,a1,a2;
   slope1=(line1_y2-line1_y1)/(line1_x2-line1_x1);   //Get slope of line1 (done by table
                                                      lookup in firmware)
   a1=line1_y1-slope1*line1_x1;                      //Compute intercept of line1
   slope2=(line2_y2-line2_y1)/(line2_x2-line2_x1);   //Get slope of line2 (done by table
                                                      lookup in firmware)
   a2=line2_y1-slope2*line2_x1;                      //Compute intercept of line2
   xi=-(a1-a2)/(slope1-slope2);                      //Calculate x intersection
   yi=a1+slope1*xi;                                  //Calculate y intersection
}
```

In virtually all cases, there are multiple pairs of triangular zones that have intersecting lines. This is because of the built in redundancy of the design. Redundant zone outputs are averaged to increase accuracy when all zones are working.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A method of determining the location of a touch event within a display area surrounded by a touch frame having a plurality of light emitting elements and a plurality of light receiving elements forming a plurality of triangular zones of light beam paths, each triangular zone being defined by the portion of the display area between (a) a light beam path extending from a light emitting element at one end of a row of light emitting elements to a single light receiving element and (b) a light beam path extending from a light emitting element at the other end of the row of light emitting elements to the single light receiving element, the number and positioning of receivers being sufficient to form partially overlapping zone pairs such that the touch event lies entirely within at least two zone pairs, said method comprising:

monitoring each of the zone pairs for blockage of at least one light beam path, wherein monitoring comprises:

comparing the profile of the output to an expected profile having a time-based noise threshold;

identifying a light beam as noise if there is a pulse edge in the profile prior to the noise threshold;

identifying a light beam as connected if there is a pulse edge in the profile after the noise threshold; and identifying all other light beams as blocked; and upon such blockage, calculating the location of the touch event associated with the blockage based on the slopes and end points of at least two intersecting blocked light beam paths from a first zone pair and two intersecting blocked light beam paths from a second zone pair.

2. The method of claim 1 wherein monitoring each of the zone pairs for blockage of at least one light beam path comprises:

randomly activating the light emitting elements, one at a time; and monitoring the output of each light receiving element associated with the activated light emitting element for an output indicative of a blocked light beam path.

3. The method of claim 2 wherein the light emitting elements are activated at pseudo random intervals.

4. The method of claim 2 wherein the light emitting elements are activated in a pseudo random sequence.

* * * * *